(No Model.) 4 Sheets—Sheet 3.

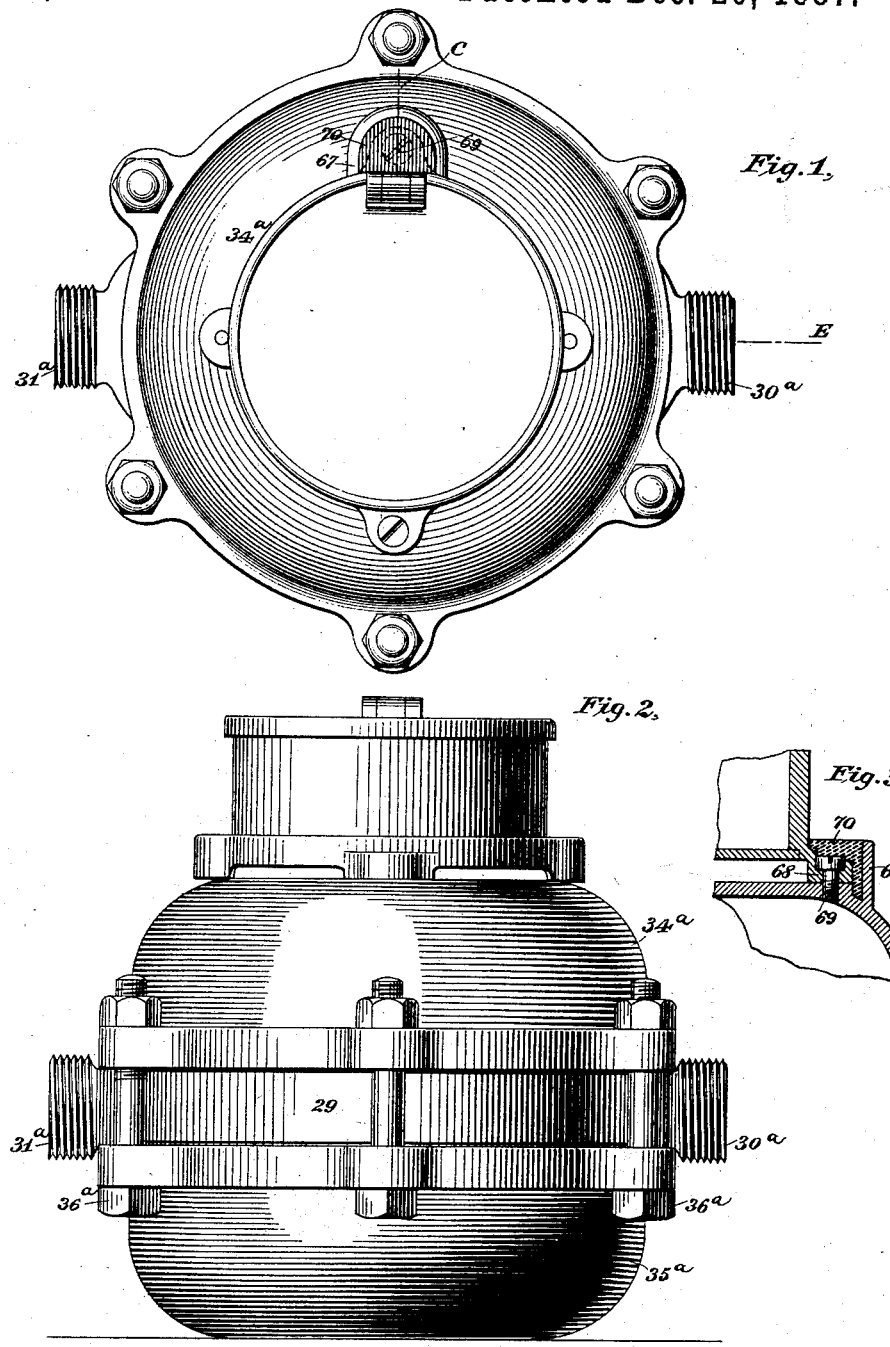

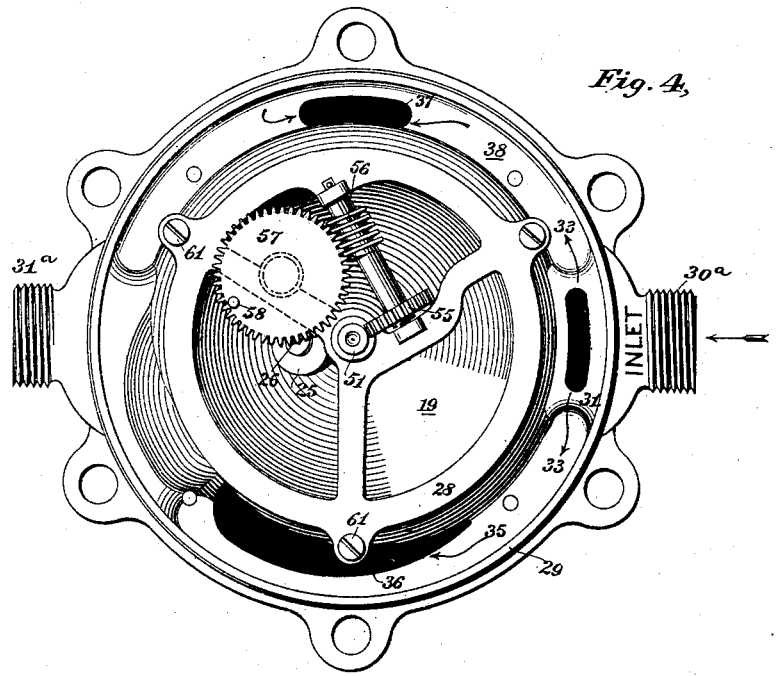

J. THOMSON & F. LAMBERT.
DISK WATER METER.

No. 375,023. Patented Dec. 20, 1887.

Witnesses:
Geo. W. Breck.
C. E. Ashley.

Inventors:
John Thomson.
Frank Lambert.

(No Model.) 4 Sheets—Sheet 4.

J. THOMSON & F. LAMBERT.
DISK WATER METER.

No. 375,023. Patented Dec. 20, 1887.

Witnesses:
Geo. W. Breck
C. E. Ashley

Inventors:
John Thomson
Frank Lambert

UNITED STATES PATENT OFFICE.

JOHN THOMSON AND FRANK LAMBERT, OF BROOKLYN, NEW YORK; SAID LAMBERT ASSIGNOR TO SAID THOMSON.

DISK WATER-METER.

SPECIFICATION forming part of Letters Patent No. 375,023, dated December 20, 1887.

Application filed July 16, 1887. Serial No. 244,532. (No model.)

*To all whom it may concern:*

Be it known that we, JOHN THOMSON and FRANK LAMBERT, of Brooklyn, county of Kings, and State of New York, have jointly invented certain new and useful Improvements in Oscillating Water-Meters, of which the following is a specification.

This is an invention in oscillating water-meters.

Figure 6:
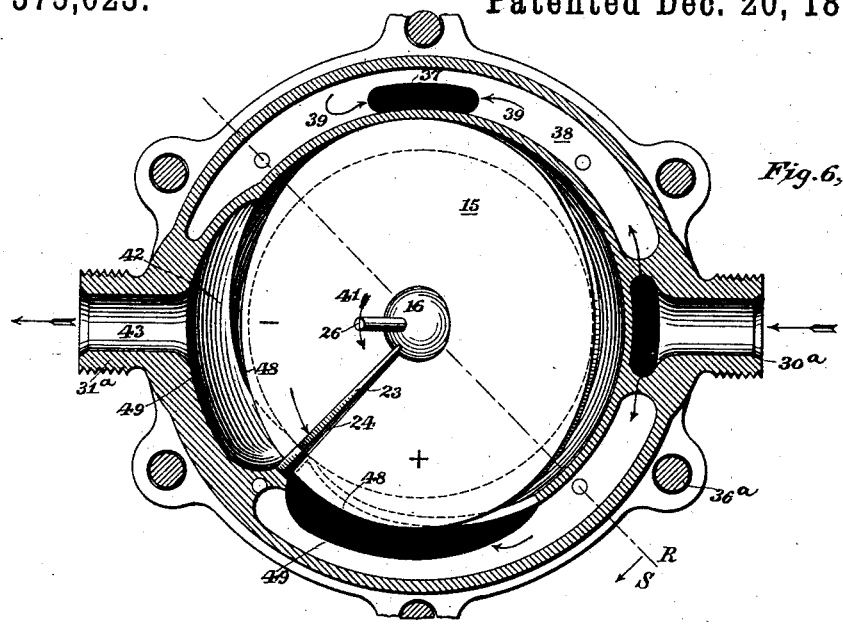
Figure 7:
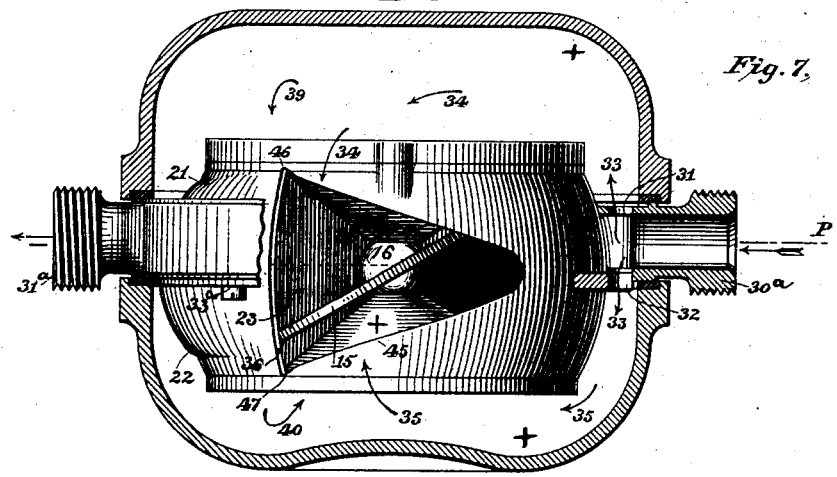
Figure 8:
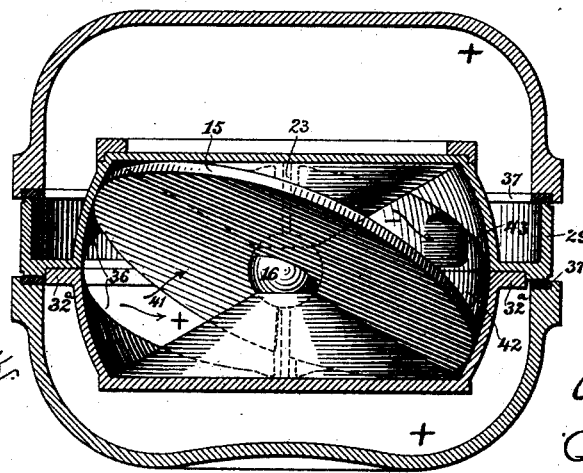
Figure 9:
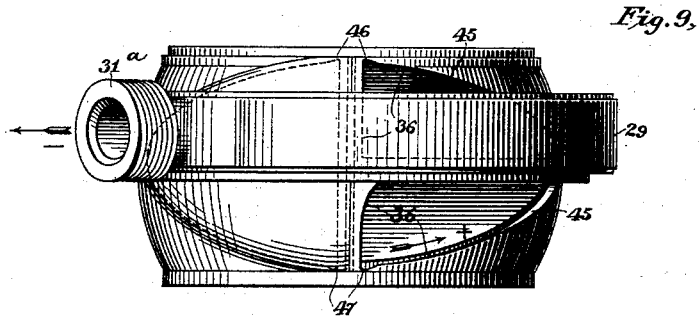
Figure 10:
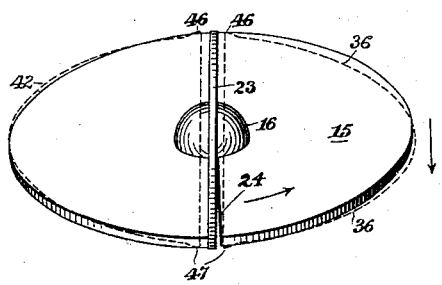
Figure 11:
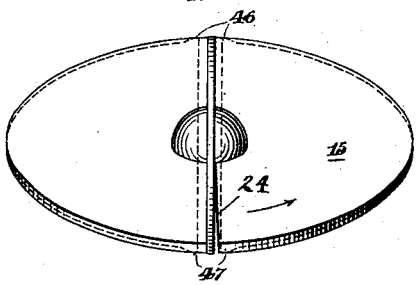
Figure 12:
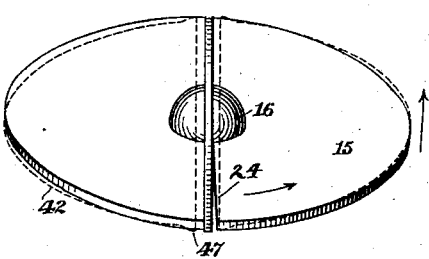

In the drawings illustrating the device, Figure 1 is a top plan view, and Fig. 2 is a front elevation, of the meter complete. Fig. 3 is a detached transverse section through a portion of the upper cylinder and register-box on the line C of Fig. 1. Fig. 4 is a complete top plan view of the interior of the meter, the upper cylinder removed. Fig. 5 is a vertical transverse section on the line E of Fig. 1. Fig. 6 is a horizontal section on line P of Figs. 5 and 7, viewed from above. Fig. 7 is a side elevation of the cylinders to illustrate the inlet-port. Fig. 8 is a vertical transverse section on the line R of Fig. 6, viewed in the direction of arrow S. Fig. 9 is an elevation and perspective of the cylinders, to illustrate both the inlet and outlet ports; and Figs. 10, 11, and 12 are detached perspective views of the oscillating disk, with the contour of the ports shown in dotted lines and the disk in different positions in relation thereto.

Our invention consists in the adaptation of the oscillating action of a disk to the purpose of positively measuring water or other fluids, and, second, in such details of construction generally as to produce a meter complete, which shall be of the minimum size, requiring the least material and involving the lowest cost to construct, and yet at the same time maintaining the elements which shall offer the highest efficiency in point of being practically frictionless, noiseless in operation, accurate, durable, and convenient to manipulate and inspect.

The oscillating disk or piston 15 is secured to and vibrates with the ball 16, which may be regarded as a part of the disk, and is borne and controlled by the sockets 17 18, formed in the apex of the cone-frusta 19 20, the latter being parts of the upper section, 21, and the lower section, 22, producing when joined the general contour in section of a spherical zone. The internal surface of the spherical portion of this disk-chamber is everywhere equidistant from the center of the ball and sockets. Were the cones fully developed, the points or apexes thereof would be half the distance of the thickness of the disk below and above the center of the ball. Therefore, presuming perfectly accurate and uniform thickness of disk, true cone-frusta, and spherical contour of disk-chamber, we shall find contact during a complete oscillation of the disk at all points of its periphery, and also two constant lines of bearing upon the cones, which thus divide the disk-chamber into two compartments; but these compartments are constantly changing rotatively; hence arises the necessity of adding the diaphragm 23, fixedly secured to the disk-chamber, which acts to effect a separation of the disk-chamber into two compartments. The diaphragm operates in the slot 24 of the disk, and also serves to prevent the differential rotation of said disk, and it should be so situated that the side against which the slotted edge of the disk impinges shall be in a plane radiating from the center of the ball.

The foregoing brief statement fairly covers the state of the art respecting the general construction of this form of piston and chamber gear up to the time of our improvements and adaptations therein.

We maintain the disk in constant and proper relation to the cones by mounting a conical roller, 25, upon the spindle 26, the latter being fixedly secured in and moving with the ball, and hence describes one circular rotation for two complete vibrations, oscillations, or reciprocations (any of which terms is properly applicable to the action) of the disk. The periphery of the roller acts upon the fixed conical bearing 27, the latter being preferably formed upon and as a part of the gear-plate 28. The roller therefore is carried rotatively by the spindle, and also revolves upon the spindle as an axis. The best form of the roller and bearing is one in which the apices of the conical surfaces of the rollers would be, if extended, at the center of the ball, as this obviates any slip in the contacting surfaces of the roll and its bearing. The advantages of these features are that the disk is controlled by rolling contact, and is therefore a practically frictionless movement, and that the relative location of the disk to the cones may be very accurately adjusted by simply increasing or decreasing the diameter of the roller or securing it at any desired position up or down upon the spindle. By this means, also, the faces of the disk may be brought out of actual contact with the cones; hence, and if the periphery of the disk be also of a slightly-less diameter than the spherical section of the disk-chamber, it will consequently act without abrasion of its surface, except at the ball and socket.

Upon and as a part of the upper section of the disk-chamber 21 is an annular flange or ring, 29, and upon this are formed the projecting inlet and outlet spuds $30^a$ $31^a$. The lower section, 22, of the disk-chamber is secured to the upper section by the flange $32^a$ and by screws $33^a$. The external pressure-caps, upper and lower, $34^a$ $35^a$, are secured by bolts $36^a$ upon gaskets $37^a$, interposed between the faces of the caps and the edges of the flange 29.

The arrangement of the ports and water-ways and the direction of the current through the meter are as follows: Entering the inlet-spud 30, the fluid passes both up and down by way of the openings 31 32, arrows 33, filling all the space within the caps around the disk-chamber, which space is designated the "pressure-chamber." Continuing, the flow is now direct, as indicated by arrows 34 35, to the inlet-port 36, which is formed equally in both sections of the disk-chamber. An additional water-way, 37, is formed through the web 38 of the upper section of the disk-chamber, the object of which is to establish free circulation in any or all directions around the said disk-chamber, the current thus passing from the primary openings 31 32 both in the direction of the arrows 39 40 as well as that already noted. The disk oscillates in the direction of arrow 41, the fluid in the negative chamber being expelled through the outlet-port 42 and water-way 43 of spud 31.

It will be observed that both the inlet and outlet ports are of very large area with respect to the size of openings through the spuds, extending around nearly half of the circumference of the disk-chamber. The limitation to the size of these ports is best shown in Fig. 9, the edges 45 of which, when the disk is either at the top or bottom of the diaphragm, are just lapped by the periphery of the disk. The edges 45 of the ports should therefore be in a plane with, say, the center of the disk when the latter is in either of the positions described.

The upper and lower corners, 46 47, of the ports are formed to very nearly intersect the juncture of the cones, diaphragm, and spherical contour of the disk-chamber, as see Figs. 7, 8, and 9.

The first object of this peculiar arrangement and form of water-ways and ports is to present the greatest possible area of opening to the disk-chamber, the velocity of the current being thereby so greatly reduced that its dynamic effect upon the disk, ball, and sockets is practically inappreciable. The general trend of the current is also thereby in unison with the oscillation of the disk, which is favorable to the passage of muddy water or particles of foreign material. The balance of pressure upon the disk is nearly theoretically perfect; or, expressed in terms, the difference between the + and − chambers is that due only to the inertia of the disk, the friction of the ball and socket, and gearing of the register. Under such conditions it becomes possible to produce an instrument without extreme refinements of workmanship giving accurate results at very slow rates of flow, inasmuch as the resistance against the oscillation of the disk is so slight that it "water-packs" and operates when the known area of opening around the disk is many times greater than that of the outlet.

The second object sought is the avoidance of compression of the fluid when displacing from one side of the disk to the other, and this is obviated by forming the breadth of the ports—as, say, between the points 48 49—to nearly equal the volume of greatest displacement.

The third object sought is both to avoid confinement of the fluid between the disk and the cone at the instant of changing the direction of each distinct oscillation, and also to prevent communication at this instant between the + and − chambers, or from inlet to outlet direct. This result is found to be attained by the construction of that portion of the ports shown at 46 47, and is demonstrated in the diagram, Figs. 10, 11, and 12, which respectively show the disk, first, just as it nears the end of the downward oscillation, the corner 47 of the inlet-port 36 being slightly open; second, the downward oscillation terminated and both the inlet and outlet corners of the ports closed; third, the upward oscillation beginning and the reverse corner 47 of the outlet-port 42 open. Thus the disk acts as a valve to the ports without confinement or compression of fluid.

By the described arrangements of water-ways and ports and construction of disk-chamber and pressure-caps the entire working apparatus is suspended in a neutral chamber having a balance of pressure within and without.

The sum of the oscillations of the disk is transmitted to the stuffing-box spindle 50, which connects with the register, by means of the worm 51, driven by the primary spindle 52 and arm 53, fast to the spindle, having contact against and being driven by the sleeve 54 of the roller. The worm 51 engages the gear 55, which latter again carries a secondary worm, 56, and engages the gear 57, this having a projecting pin, 58, contacting with the arm 59, fast to the spindle 50. It is of course evident that other forms of gear-trains may be employed to effect a proper transmission to the register, and the novelty of this application consists in mounting the entire internal train upon the single gear-plate 28, and in then securing the said gear-plate accurately and rigidly to the upper section of the disk-chamber by the flange and shoulder 60, the union being maintained by screws, as 61.

The advantages of this construction are that the center of the conical bearing 27 is readily formed to lie in the exact axial line, as 62, Fig. 5, and at a right angle to the horizontal plane of the disk-chamber—a result of the utmost importance to the truth of the action of the disk and roller—while the gearing is thus very convenient to assemble and adjust, being separate and distinct until ready to apply, but when so attached is yet a part of the disk-chamber, free from the external cap or dome, whereby the latter may be removed without disturbing any portion of the gear-train, which is open and conveniently disposed for inspection.

Attention is called to the fact that by this arrangement of water-ways and ports there is practically no retardation of the flow, the loss of head being simply that due to the slight circular deflection from the original line of introduction, and which is partially compensated by the increased area and reduced velocity through the meter.

To obviate any liability of clogging the register, the case 63 is fitted with an internal plate, 64, secured as by the screws 65. The register is first screwed to the plate. The spindle 50 is fitted moderately close, so that between the case, the plate, and the glass 66 the mechanism of the register is thoroughly guarded against foreign material—a matter of importance when it is borne in mind that meters are often packed in sawdust, &c., to protect against freezing. The usual practice heretofore has been simply to depend upon the contact of the edge of the case upon the upper surface of the cap to exclude such matter.

To securely seal the meter, a rib, 67, Fig. 3, is cast on the cap, arranged to partially surround one of the lugs 68 of the case. The screw 69 secures the case to the cap. Wax 70 is then run over the head of the screw, filling the recess formed by the rib, and the wax may not then be readily or accidentally interfered with except by those in authority.

Attention is called to the fact that the meter is operative in either direction of flow; but in reversing the operation herein described the direct impact of the inflowing current would be against the ball and upon the edges of the disk, with obvious disadvantage.

We claim—

1. The combination, with the disk-chamber and the oscillating disk, of the rotating roller acting upon a fixed bearing.

2. The conical roller and corresponding conical fixed bearing, in combination with the oscillating disk and disk-chamber.

3. The gear-plate 28, upon which is formed the conical bearing 27, in combination with the disk-chamber, oscillating disk, and roller, for the purpose specified.

4. The combination, with the disk-chamber and oscillating disk contained thereon, carrying a conical roller, of the gear-plate 28, carrying a conical bearing upon its under side, and having mounted on its upper side the internal gear-train of the registering mechanism, the said plate being detachably mounted upon the outside of said chamber.

5. The combination, with the external pressure-caps, of the disk-chamber and oscillating disk operating therein, the said chamber having ports and water-ways, substantially as described, whereby the current flows directly from the opening in the spud to the chamber formed by the pressure-caps above and below the outside of the disk-chamber, and thence passes within and through the said disk-chamber.

6. The combination, with the outer chamber, of the sections of the disk-chamber having a port, 36, formed equally in both sections.

7. The combination of the disk-chamber and disk therein, the chamber having the ports 36 42, the upper and lower edges of which extend circumferentially around the disk-chamber to or about ninety degrees, substantially as described.

8. The combination of the disk-chamber consisting of sections 21 22, the stationary diaphragm, the oscillating disk inclosed in said disk-chamber, the said disk-chamber being provided with ports 36 and 45, and the pressure-chamber, one of the said ports opening directly to the spud or pipe and the other of said ports opening to the said pressure-chamber, substantially as described.

In testimony whereof we have signed our names to this specification in the presence of two subscribing witnesses.

JOHN THOMSON.
FRANK LAMBERT.

Witnesses:
WM. THOMSON,
JAMES FROST.